(12) United States Patent
Yin et al.

(10) Patent No.: US 11,984,662 B2
(45) Date of Patent: May 14, 2024

(54) TRANSMISSION MECHANISM FOR BASE STATION ANTENNA AND BASE STATION ANTENNA

(71) Applicant: CommScope Technologies LLC, Hickory, NC (US)

(72) Inventors: Yicheng Yin, Jiangsu (CN); PuLiang Tang, Jiangsu (CN)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 271 days.

(21) Appl. No.: 17/632,096

(22) PCT Filed: Aug. 2, 2021

(86) PCT No.: PCT/US2021/044131
§ 371 (c)(1),
(2) Date: Feb. 1, 2022

(87) PCT Pub. No.: WO2022/039915
PCT Pub. Date: Feb. 24, 2022

(65) Prior Publication Data
US 2023/0307830 A1    Sep. 28, 2023

(30) Foreign Application Priority Data

Aug. 20, 2020  (CN) .......................... 202010840645.1

(51) Int. Cl.
*H01Q 3/32* (2006.01)
*F16H 19/04* (2006.01)
(Continued)

(52) U.S. Cl.
CPC .............. *H01Q 3/32* (2013.01); *F16H 19/04* (2013.01); *F16H 55/26* (2013.01); *H01Q 1/1228* (2013.01); *H01Q 1/246* (2013.01)

(58) Field of Classification Search
CPC .................................. H01Q 3/32; F16H 19/04
See application file for complete search history.

(56) References Cited

U.S. PATENT DOCUMENTS

| 11,355,839 B1 * | 6/2022 | Zou .......................... H01Q 3/32 |
| 2020/0052397 A1 | 2/2020 | Yang et al. |

(Continued)

FOREIGN PATENT DOCUMENTS

| CN | 105720370 A | 6/2016 |
| CN | 206274548 U | 6/2017 |

(Continued)

OTHER PUBLICATIONS

"Extended European Search Report corresponding to European Application No. 21854863.4 dated Jun. 9, 2023".

(Continued)

*Primary Examiner* — Daniel D Yabut
(74) *Attorney, Agent, or Firm* — Myers Bigel, P.A.

(57) ABSTRACT

The present invention relates to a transmission mechanism for a base station antenna, and a base station antenna including the transmission mechanism. The transmission mechanism includes: a worm gear unit, which includes a worm driven by a motor and a worm gear meshed and connected with the worm; at least one gear pair, each gear pair including a small gear and a large gear that mesh with each other, the small gear and the worm gear being mounted on a common first drive shaft so that the small gear and the worm gear rotate synchronously; and at least one connecting rod, each connecting rod including a first rack element fixedly mounted thereon, wherein the large gear of each gear pair is meshed and connected with the first rack element on a corresponding connecting rod so as to axially move the connecting rod via the first rack element when the large gear of each gear pair rotates.

20 Claims, 8 Drawing Sheets

(51) Int. Cl.
  *F16H 55/26*   (2006.01)
  *H01Q 1/12*    (2006.01)
  *H01Q 1/24*    (2006.01)

(56)           References Cited

U.S. PATENT DOCUMENTS

2020/0212565 A1   7/2020  Li et al.
2020/0220260 A1   7/2020  Li et al.
2022/0037783 A1*  2/2022  Li ........................... H01P 1/18

FOREIGN PATENT DOCUMENTS

CN        111180893 A        5/2020
CN        114465005 A   *    5/2022
CN        116053786 A   *    5/2023
DE     102018119418 A1       2/2020
EP         4075591 A1       10/2022
KR       20130036943 A       4/2013
WO    WO-2017113274 A1  *    7/2017   .............. H01Q 1/24
WO    WO-2019091239 A1  *    5/2019   .............. F16H 1/20

OTHER PUBLICATIONS

"International Search Report and Written Opinion corresponding to International Application No. PCT/US2021/044131 dated Nov. 19, 2021".
"International Preliminary Report on Patentability corresponding to International Application No. PCT/US2021/044131 dated Mar. 2, 2023".

* cited by examiner

TRANSMISSION MECHANISM FOR BASE STATION ANTENNA AND BASE STATION ANTENNA

RELATED APPLICATION

The present application is a 35 U.S.C. § 371 national phase application of PCT Application PCT/US2021/044131, filed Aug. 2, 2021, which claims priority from and the benefit of Chinese Patent Application No. 202010840645.1, filed Aug. 20, 2020, the disclosure of each of which is hereby incorporated herein in its entirety.

TECHNICAL FIELD

The present invention generally relates to a communication system. More particularly, the present invention relates to a transmission mechanism for a base station antenna, and a base station antenna including such transmission mechanism.

BACKGROUND ART

A cellular communication system is used to provide wireless communication to fixed and mobile users. The cellular communication system may include a plurality of base stations, and each base station provides a wireless cellular service for a designated coverage area (generally referred to as a "cell"). Each base station may include one or more base station antennas, and the base station antenna is used to transmit radio frequency ("RF") signals to a user located in a cell served by the base station and receive RF signals from the user. The base station antenna is a directional device that can concentrate RF energy transmitted in certain directions or received from certain directions.

A modern base station antenna usually includes two, three or more linear (or planar) arrays of radiating elements, where each linear array has an electronically adjustable downtilt angle. The linear array usually includes a cross-polarized radiating element, and is provided with a separate phase shifter for electronically adjusting the downtilt angle of antenna beams for each polarization, so that the antenna can include twice the phase shifters of the linear array. In addition, in many antennas, a separate transmitting and receiving phase shifter is provided so that transmitting and receiving radiation patterns can be adjusted independently. This would again doubles the number of phase shifters. Therefore, it is not surprising that the base station antenna has eight, twelve, eighteen, thirty-two, or more phase shifters for applying remote electrical downtilt angles to linear arrays.

A remote electrical tilt ("RET") actuator and an associated transmission mechanism may be provided in the base station antenna to adjust the phase shifter. Conventionally, each phase shifter is equipped with a separate RET actuator, which results in the base station antenna including a large number of RET actuators, thereby significantly increasing the size, weight, and cost of the base station antenna. Therefore, in some cases, it is necessary to use a RET actuator including a single motor to simultaneously drive a plurality of phase shifters.

Figure 1:
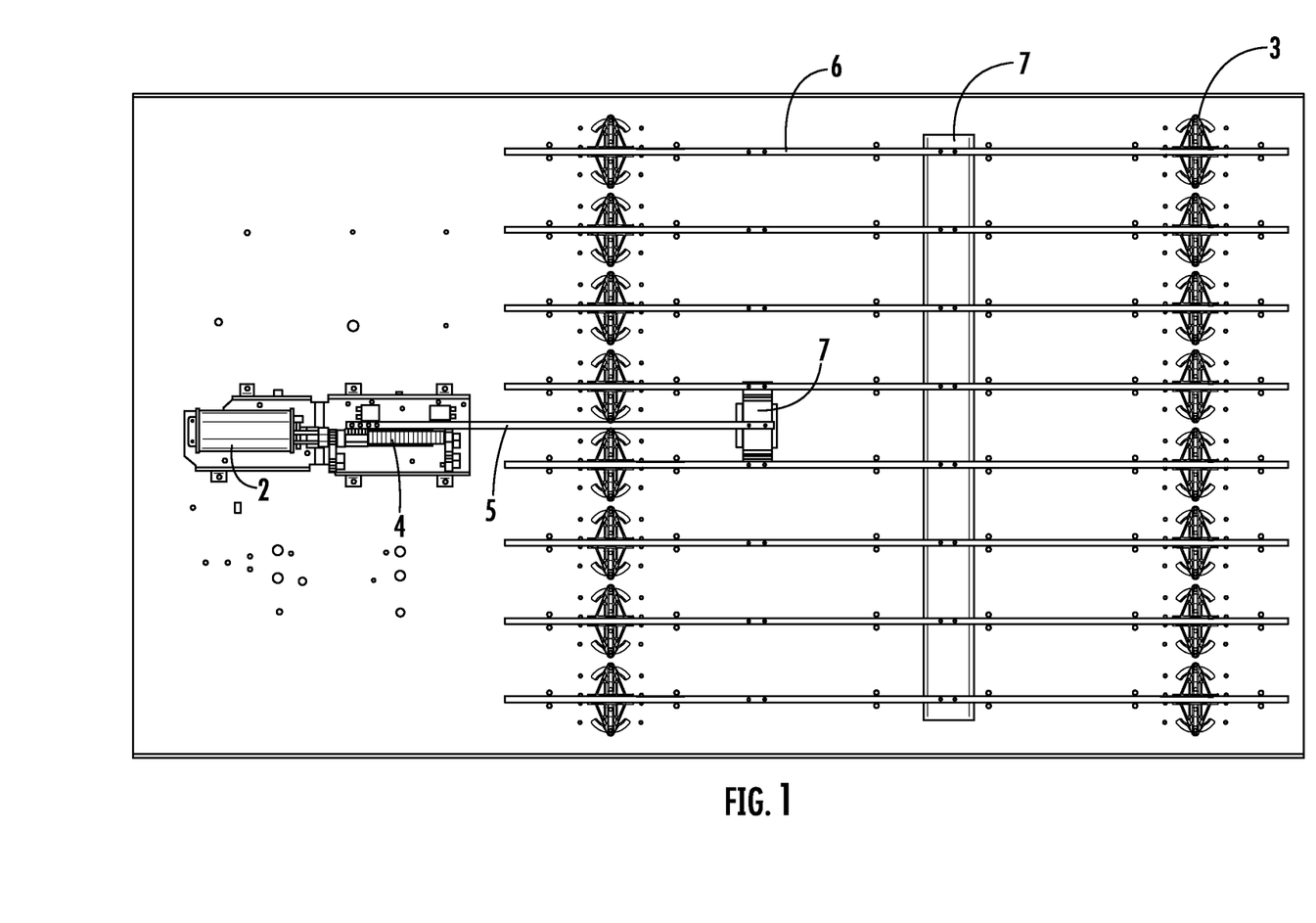
FIG. 1 shows a transmission mechanism for a base station antenna in the prior art.

FIG. 1 shows a transmission mechanism 1 of the prior art, which attempts to use a single motor 2 to drive a plurality of shifters 3. The transmission mechanism 1 includes a driving rod 5 driven by the motor 2 via a screw 4 and a plurality of connecting rods 6 parallel to the driving rod 5 and spaced apart from each other in a transverse direction perpendicular to an axial direction of the driving rod 5. Each connecting rod 6 can drive one or more phase shifters to adjust downtilt angles thereof. A plurality of connecting rods 6 are fixed together via one or more connecting plates 7 to simultaneously move axially when driven by the driving rod 5, thereby driving a plurality of phase shifters.

Limited by the output power of the motor 2, the transmission mechanism 1 of the prior art can only drive a limited number of phase shifters. For example, currently a motor usually used in a base station antenna can generate a pulling force of about 10 lbf, while a pulling force of about 0.7 lbf is needed to drive a phase shifter. Therefore, a motor can only drive up to 14 phase shifters. However, in some cases, it is required that a single motor be used to drive at least 32 phase shifters, and the transmission mechanism 1 obviously cannot meet such requirement.

Moreover, since the plurality of connecting rods 6 are spaced apart from each other in the transverse direction, each connecting rod 6 has a moment arm as compared with the driving rod 5, and has torque as a result. Since each connecting rod 6 has a different moment arm size compared with the driving rod 5, the generated torque is also different, which will cause the plurality of connecting rods 6 to generate uneven driving forces and therefore affect the adjustment accuracy of the corresponding phase shifters.

Figure 2A:
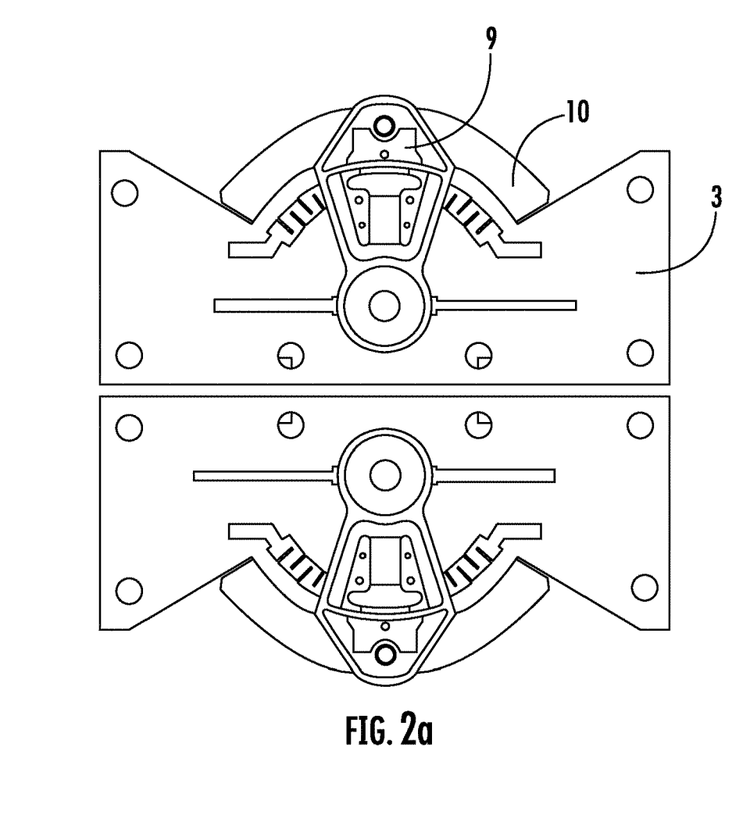
FIG. 2a and FIG. 2b respectively show the connection between a transmission mechanism and a phase shifter in the prior art from the front and the back.
Figure 2B:
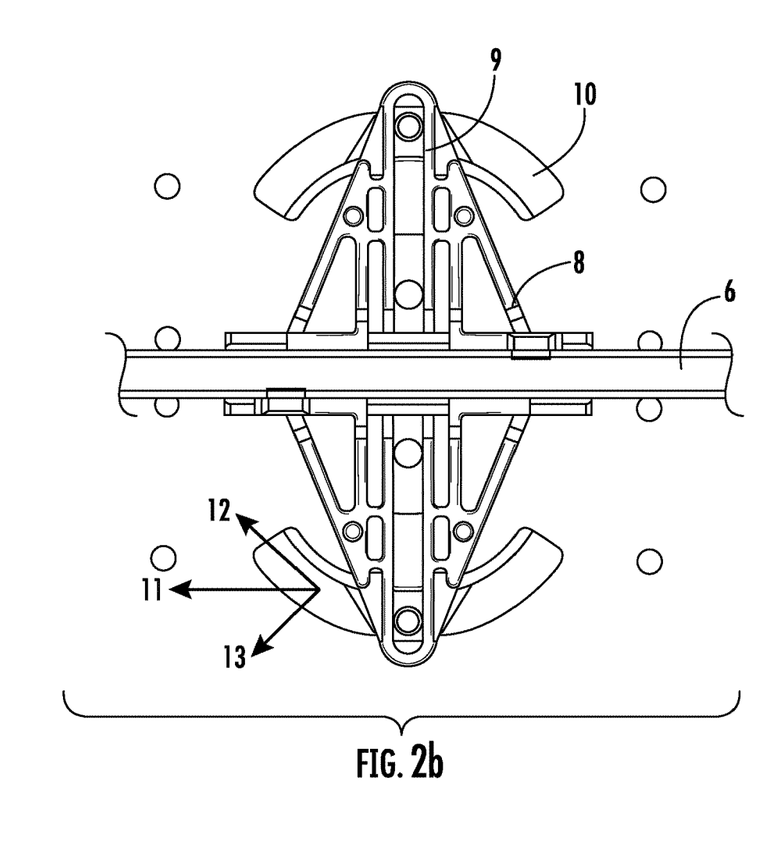

Furthermore, as shown in FIG. 2a and FIG. 2b, in the prior art, each connecting rod 6 drives a movable element 9 of each phase shifter via a connecting element 8 fixed thereon to make the movable element 9 move in an arc-shaped groove 10. When the movable element 9 deviates from the central position of the arc-shaped groove 10, a pulling force 11 generated by the connecting rod 6 will generate a tangential component 12 and a radial component 13, of which only the tangential component 12 can be used to drive the movable element 9. This reduces the effective pulling force generated by the connecting rod 6, thereby further reducing the number of phase shifters that can be driven by a single motor 2. In addition, when the movable element 9 moves to both ends of the arc-shaped groove 10, the movable element 9 may be stuck at the end portions of the arc-shaped groove 10 and be difficult to move out. Therefore, a larger force is required, which further reduces the number of phase shifters that can be driven by a single motor 2.

SUMMARY OF THE INVENTION

An object of the present invention is to provide a transmission mechanism for a base station antenna and a base station antenna including the transmission mechanism, which can overcome at least one defect in the prior art.

In a first aspect of the present invention, a transmission mechanism for a base station antenna is provided. The transmission mechanism may include: a worm gear unit, which includes a worm driven by a motor and a worm gear meshed and connected with the worm; at least one gear pair, each gear pair including a small gear and a large gear that mesh with each other, the small gear and the worm gear being mounted on a common first drive shaft so that the small gear and the worm gear rotate synchronously; and at least one connecting rod, each connecting rod including a first rack element fixedly mounted thereon, wherein the large gear of each gear pair is meshed and connected with the first rack element on a corresponding connecting rod so as to axially move the connecting rod via the first rack element when the large gear of each gear pair rotates.

According to an embodiment of the present invention, the transmission mechanism may further include an arc-shaped connecting member adapted to be fixedly connected to a movable element of a phase shifter, and the arc-shaped connecting member is configured to be rotationally driven to cause the movable element of the phase shifter to move along an arc.

According to an embodiment of the present invention, the arc-shaped connecting member may be configured as an arc-shaped rack, a plurality of teeth are provided on a front end surface of the arc-shaped rack, each connecting rod may include at least one second rack element mounted thereon, and the second rack element is meshed and connected with the plurality of teeth of the arc-shaped rack so as to rotate the arc-shaped rack when the connecting rod moves axially.

According to an embodiment of the present invention, each second rack element may include two sets of teeth arranged in a mirror image, and each set of teeth is meshed and connected with an arc-shaped rack so that each second rack element can simultaneously drive two movable elements of a pair of phase shifters.

According to an embodiment of the present invention, the at least one gear pair may include a plurality of gear pairs, and small gears of the plurality of gear pairs are mounted on the first drive shaft being spaced apart from each other.

According to an embodiment of the present invention, large gears of the plurality of gear pairs may be mounted on a second drive shaft being spaced apart from each other.

According to an embodiment of the present invention, the worm may extend in a direction of the connecting rod, and the first drive shaft may extend in a direction perpendicular to the connecting rod.

According to an embodiment of the present invention, one end of the worm may be directly or indirectly connected with an output shaft of the motor, and the other end of the worm may be supported by a supporting element.

According to an embodiment of the present invention, the gear ratio of the worm gear and the worm may be from 15 to 50.

According to an embodiment of the present invention, the first drive shaft may have a non-circular cross section, and the small gear may have a non-circular hole used for the first drive shaft.

According to an embodiment of the present invention, the first drive shaft may be integrally formed with the worm gear and/or the small gear.

According to an embodiment of the present invention, the second drive shaft may be integrally formed with the large gear.

According to an embodiment of the present invention, each gear pair may include a supporting member used for the small gear.

According to an embodiment of the present invention, the small gear may include a body including a tooth portion provided with teeth and a shaft portion adapted to be mounted in the supporting member to enable the small gear to rotate. The supporting member may include an annular sleeve, and the shaft portion of the small gear may be rotatably mounted in the annular sleeve.

According to an embodiment of the present invention, the first rack element may include a bottom plate, a vertical plate extending vertically upward from one side of the bottom plate, and a rack located at a top end of the vertical plate, and the vertical plate is provided with a connecting element for connecting with the connecting rod.

According to an embodiment of the present invention, the connecting element may include one or more selected from the group consisting of a post, a snap clip, a bolt, a hook and a connecting fastener, and a groove.

According to an embodiment of the present invention, the second rack element may include a bottom plate, one surface of the bottom plate is provided with a rack and the other opposite surface is provided with a connecting element for connecting with the connecting rod.

According to an embodiment of the present invention, the connecting rod may be made of glass fiber or metal.

According to an embodiment of the present invention, the first drive shaft may be made of glass fiber or metal.

According to an embodiment of the present invention, the second drive shaft may be made of glass fiber or metal.

According to an embodiment of the present invention, the transmission mechanism may be configured to simultaneously drive at least 32 phase shifters by a single motor.

In a second aspect of the present invention, a base station antenna is provided. The base station antenna may include the transmission mechanism for a base station antenna according to any one embodiment of the present invention.

It should be noted that various aspects of the present invention described for one embodiment may be included in other different embodiments, although specific description is not made for the other different embodiments. In other words, all the embodiments and/or features of any embodiment may be combined in any manner and/or combination, as long as they are not contradictory to each other.

BRIEF DESCRIPTION OF THE ATTACHED DRAWINGS

Multiple aspects of the present invention will be better understood after the following specific embodiments are read with reference to the attached drawings. In the attached drawings.

It should be understood that in all the attached drawings, the same reference numerals and signs denote the same elements. In the attached drawings, the size of certain features may be changed and are not drawn to scale for clarity.

SPECIFIC EMBODIMENTS

The present invention will be described below with reference to the attached drawings, and the attached drawings illustrate several embodiments of the present invention. However, it should be understood that the present invention may be presented in many different ways and is not limited to the embodiments described below; in fact, the embodiments described below are intended to make the disclosure of the present invention more complete and to fully explain the protection scope of the present invention to those skilled in the art. It should also be understood that the embodiments disclosed in the present invention may be combined in various ways so as to provide more additional embodiments.

It should be understood that the terms in the specification are only used to describe specific embodiments and are not intended to limit the present invention. Unless otherwise defined, all terms (including technical terms and scientific terms) used in the specification have the meanings commonly understood by those skilled in the art. For brevity and/or clarity, well-known functions or structures may not be described in detail.

The singular forms "a", "an", "the" and "this" used in the specification all include plural forms unless clearly indicated. The words "include", "contain" and "have" used in the specification indicate the presence of the claimed features, but do not exclude the presence of one or more other features. The word "and/or" used in the specification includes any or all combinations of one or more of the related listed items.

In the specification, when it is described that an element is "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present.

In the specification, the terms "first", "second", "third", etc. are only used for convenience of description and are not intended to be limiting. Any technical features represented by "first", "second", "third", etc. are interchangeable.

In the specification, terms expressing spatial relations such as "upper", "lower", "front", "rear", "top", and "bottom" may describe the relation between one feature and another feature in the attached drawings. It should be understood that, in addition to the orientations shown in the attached drawings, the terms expressing spatial relations further include different orientations of a device in use or operation. For example, when a device in the attached drawings is turned upside down, the features originally described as being "below" other features now can be described as being "above" the other features. The device may also be oriented in other directions (rotated by 90 degrees or in other orientations), and in this case, a relative spatial relation will be explained accordingly.

Figure 3:
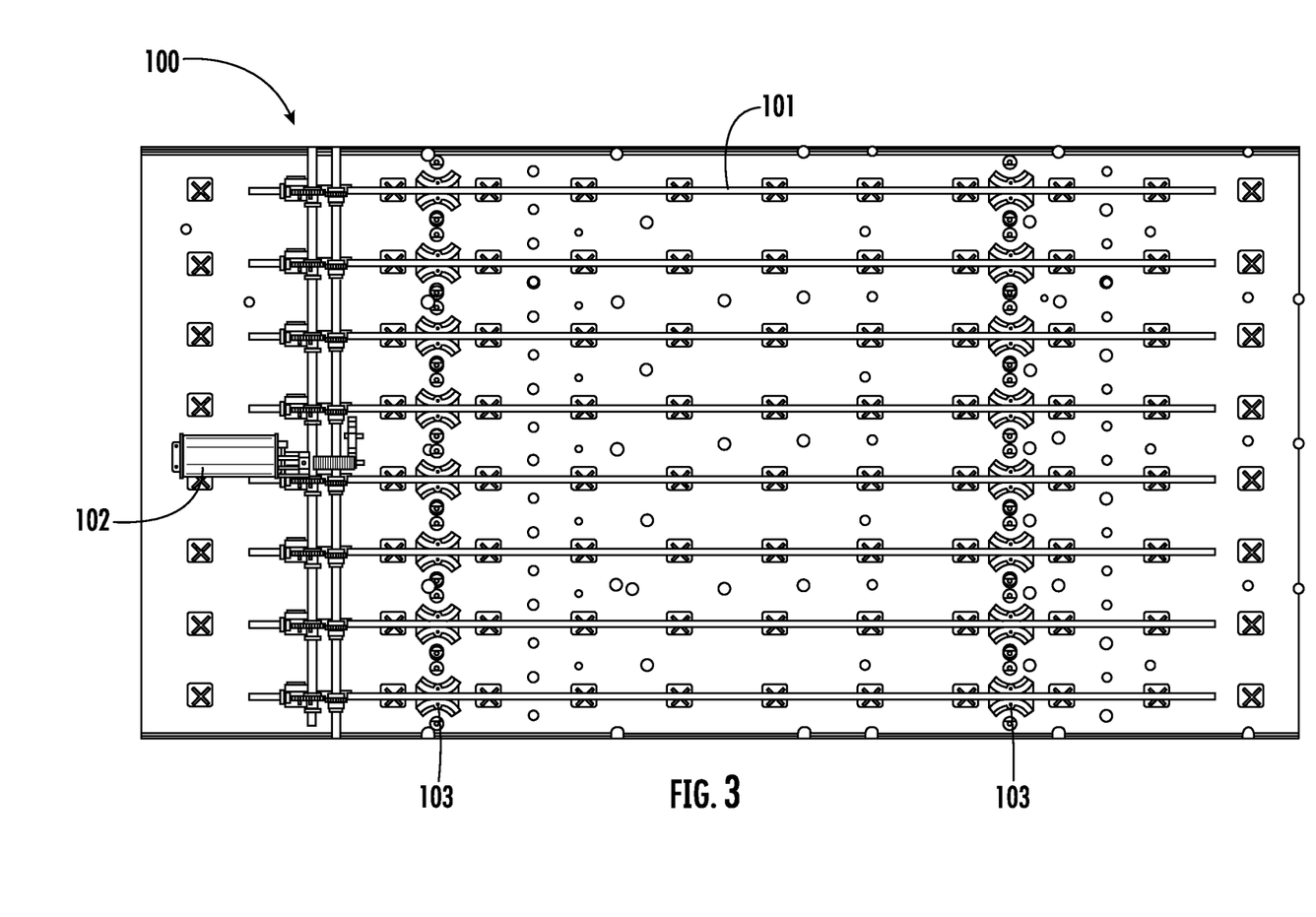
FIG. 3 is a front view showing a transmission mechanism for a base station antenna according to an embodiment of the present invention.
Figure 4:
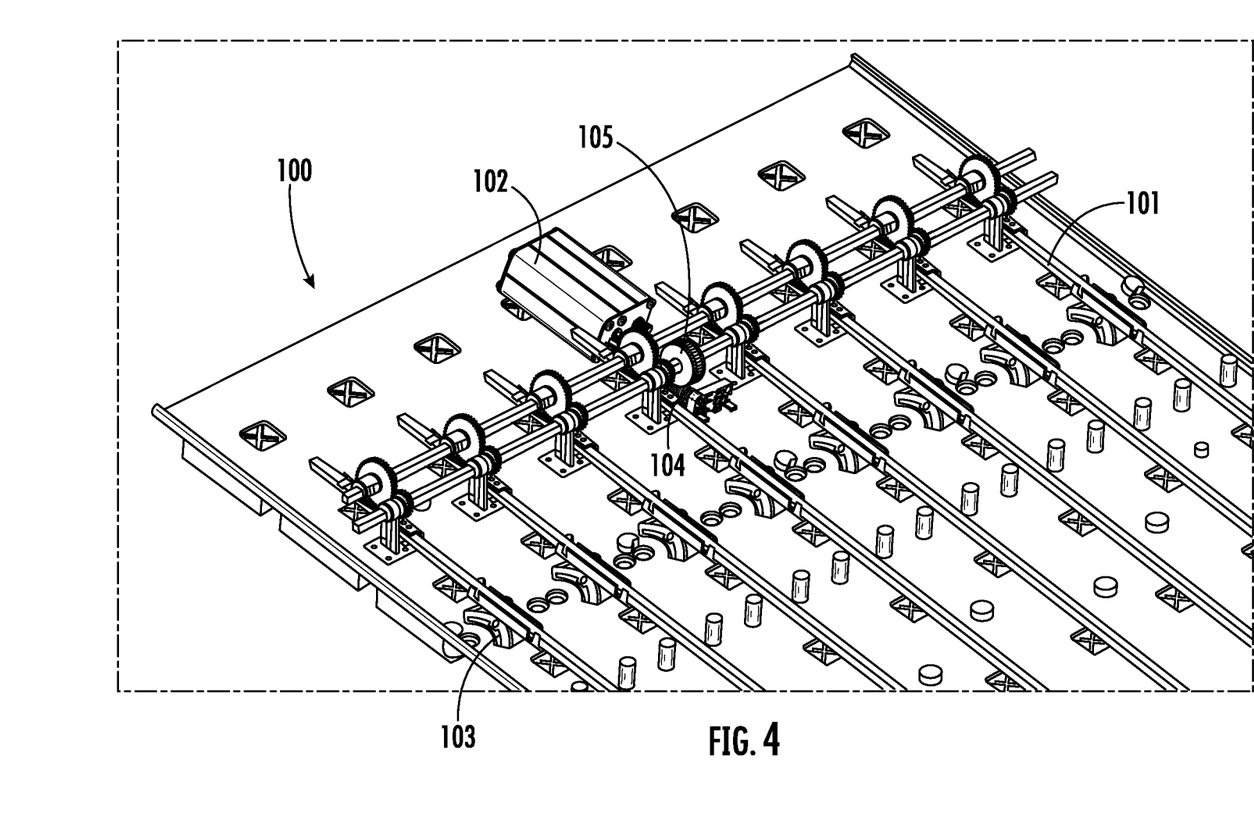
FIG. 4 is a partial perspective view of the transmission mechanism shown in FIG. 3.

Referring to FIG. 3 and FIG. 4, a transmission mechanism 100 for a base station antenna according to an embodiment of the present invention is shown. The transmission mechanism 100 may include a plurality of connecting rods 101 arranged in parallel. The plurality of connecting rods 101 may be driven by a single motor 102 simultaneously to move axially, and each connecting rod 101 may drive a movable element (for example, a brush piece of a rotating brush-type phase shifter) of one or more phase shifters 103 when moving axially to adjust a directional angle (for example, an elevation angle or a downtilt angle) of antenna beams generated by the base station antenna. In the embodiments shown in FIG. 3 and FIG. 4, the transmission mechanism 100 includes eight connecting rods 101 arranged in parallel, and each connecting rod 101 can simultaneously drive two pairs of shifters 103 spaced apart in the axial direction of the connecting rod 101. Therefore, the transmission mechanism 100 can simultaneously drive 32 phase shifters. However, the present invention is not limited thereto, and the transmission mechanism 100 of the present invention may be used to drive any other number of phase shifters. In an embodiment of the present invention, the connecting rod 101 may be made of glass fiber, other plastics, or metal.

The transmission mechanism 100 may include a worm gear unit. As shown more clearly in FIG. 5, the worm gear unit may include a worm 104 extending in the direction of the connecting rod 101 and a worm gear 105 meshed and connected with the worm 104. The worm 104 is configured to be driven by the motor 102 to rotate about its longitudinal axis. To this end, one end of the worm 104 may be directly or indirectly connected with an output shaft of the motor 102, and the other end of the worm 104 may be supported by a supporting element 106. The worm gear 105 may be arranged above the worm 104 and rotate driven by the worm 104. The central axis of the worm gear 105 may be arranged to be perpendicular to the worm 104.

Figure 5:
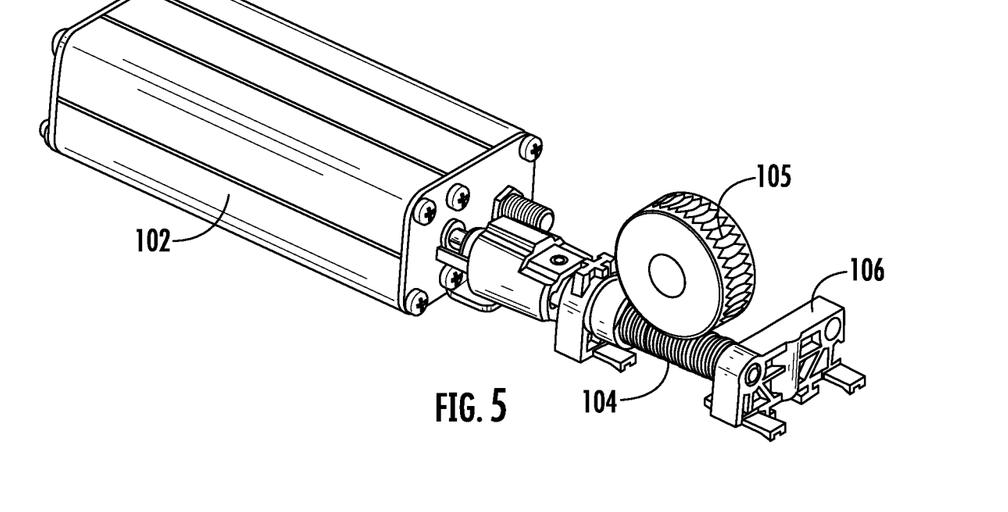
FIG. 5 shows a worm gear unit of the transmission mechanism shown in FIG. 3.

In an embodiment according to the present invention, the output torque of the motor 102 may be amplified to varying degrees by selecting the gear ratio of the worm gear 105 and the worm 104 of the worm gear unit, so that a single motor 102 can drive a larger number of phase shifters. Generally speaking, the number of heads of the worm 104 may be 1 to 5, and the number of teeth of the worm gear 105 may be several times the number of the heads of the worm 104. In an embodiment according to the present invention, the number of heads of the worm 104 may be 1, and the number of teeth of the worm gear 105 may be 15 to 50. Therefore, the gear ratio of the worm gear 105 and the worm 104 is from 15 to 50. In this way, the worm gear unit can amplify the output torque of the motor 102 by 15 to 50 times, so that when the same motor is used for driving, the pulling force generated by the transmission mechanism 100 is 15 to 50 times the pulling force generated by the transmission mechanism 1 in the prior art. The gear ratio of the worm gear 105 and the worm 104 may also be in other appropriate ranges, such as 5 to 50, 10 to 50, 5 to 40, 5 to 35, 5 to 30, 5 to 20, and so on.

The worm gear unit can reduce the output rotation speed of the motor 102 while amplifying the output torque of the motor 102, and a lower rotation speed makes it possible to adjust the phase shifter more accurately. In addition, comparing with the screw 4 used in the prior art, the worm 104 of the worm gear unit can have a smaller length, which can reduce the space occupied by the transmission mechanism 100 in the base station antenna.

The transmission mechanism 100 may further include a plurality of gear pairs, and each gear pair is used to drive a corresponding connecting rod 101. In the embodiments shown in FIG. 3 and FIG. 4, since the transmission mechanism 100 includes eight connecting rods 101, it correspondingly includes eight gear pairs. The gear pair is used to further amplify the output torque of the motor 102. As shown more clearly in FIG. 4 and FIG. 6, each gear pair includes a small gear 106 and a large gear 107 meshed with the small gear 106. All the small gears 106 of the plurality of gear pairs and the worm gear 105 are mounted on a common drive shaft 108 so that the small gears 106 rotate synchronously with the worm gear 105. The drive shaft 108 extends in a direction perpendicular to the connecting rod 101, and the small gears 106 of the plurality of gear pairs are spaced apart from each other on the drive shaft 108. The drive shaft 108 can ensure that the small gears 106 of the plurality of gear pairs have the same rotation speed, and can evenly transmit the output torque of the worm gear 105 to each small gear 106 via the drive shaft 108. This can solve the problem that the driving forces of the plurality of connecting rods 6 are uneven in the transmission mechanism 1 in the prior art, and thus can more accurately adjust a plurality of phase shifters in the base station antenna synchronously.

Figure 6:
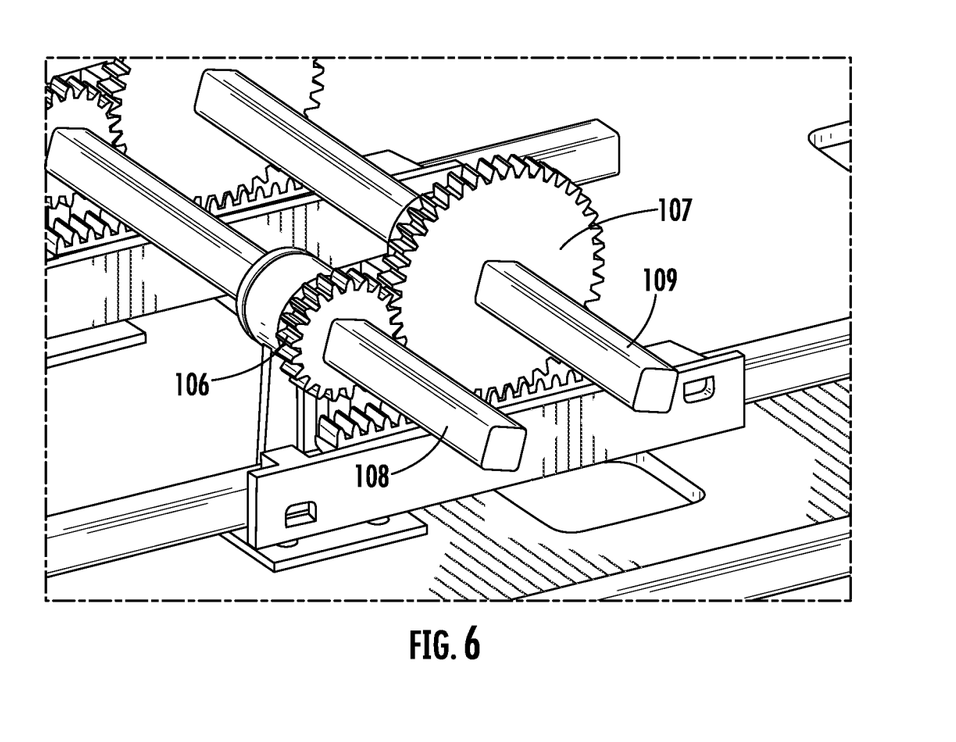
FIG. 6 shows a gear pair of the transmission mechanism shown in FIG. 3 and a rack element fixed on a connecting rod.

Similarly, all the large gears 107 of the plurality of gear pairs may also be mounted on a common drive shaft 109 and be spaced apart from each other. The drive shaft 109 makes all the large gears 107 of the plurality of gear pairs have the same rotation speed and therefore have a uniform output torque. However, in other embodiments according to the present invention, the large gears 107 of the plurality of gear pairs may also not be mounted on the common drive shaft 109 but are independent of each other.

According to needs, the output torque of the motor 102 may be further amplified to varying degrees and the output rotation speed of the motor 102 may be reduced at the same by selecting the gear ratio of the large gear 107 and the small gear 106. This makes it possible not only to use a single motor 102 to drive a larger number of phase shifters at the same time, but also to adjust the phase shifters more accurately at a lower speed.

In an embodiment according to the present invention, the drive shaft 108 may have a non-circular (for example, rectangular) cross-section, which extends through a non-circular hole provided in the center of the small gear 106 for matching with the non-circular cross section of the drive shaft 108, so that the small gear 106 is not rotatable relative to the drive shaft 108. Similarly, the drive shaft 109 may have a non-circular (for example, rectangular) cross section, which extends through a non-circular hole provided in the center of the large gear 107 for matching with the non-circular cross section of the drive shaft 109, so that the large gear 107 is not rotatable relative to the drive shaft 109. In another embodiment of the present invention, the drive shaft 108 may be integrally formed with the small gear 106 and the worm gear 105, and the drive shaft 109 may be integrally formed with the large gear 107.

Figure 7A:
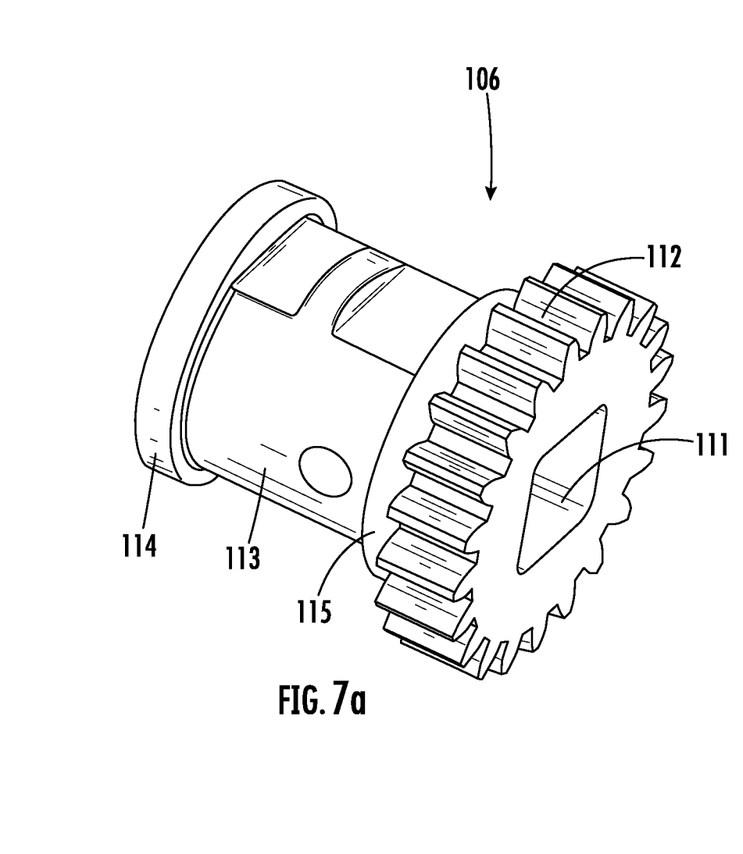
FIG. 7a and FIG. 7b respectively show the specific structure of a small gear of the gear pair shown in FIG. 6 and the specific structure of a supporting member for supporting the small gear.
Figure 7B:
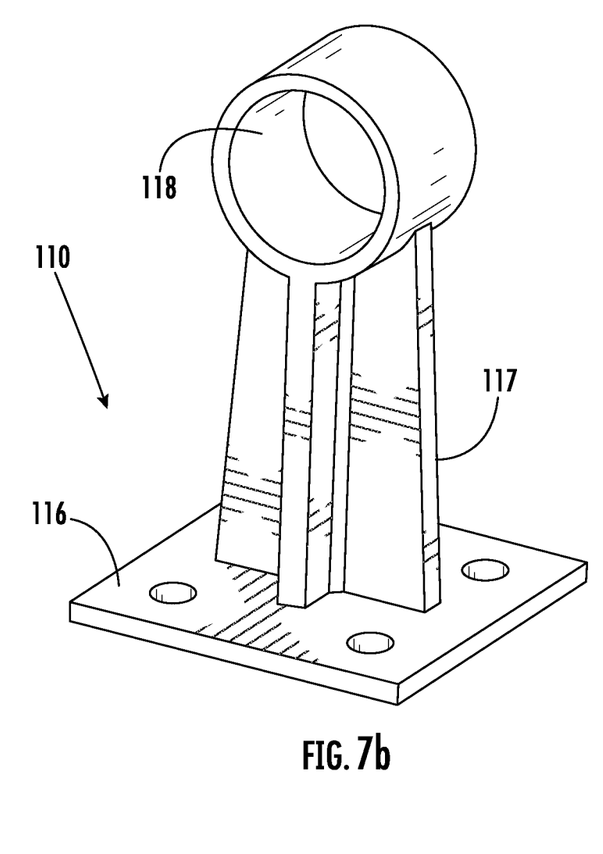

In order to enhance the support for the small gear 106, a supporting member 110 may be further provided for each small gear of the plurality of gear pairs. FIG. 7a and FIG. 7b respectively show the specific structures of the small gear 106 and the supporting member 110 according to an embodiment of the present invention. The small gear 106 may include a body having a non-circular hole 111. The body includes a tooth portion 112 provided with teeth and a shaft portion 113 adapted to be mounted in the supporting member 110 to enable the small gear to rotate. Both ends of the shaft portion 113 are provided with flanges 114 and 115, and the flanges 114 and 115 restrict the translation of the small gear 106 relative to the supporting member 110. The supporting member 110 may include a base 116, a body 117 extending upright from the base 116, and an annular sleeve 118 at the top end of the body 117. The base 116 may be fixed in the base station antenna. The shaft portion 113 of the small gear 106 may be rotatably mounted in the annular sleeve 118, wherein the flanges 114 and 115 are respectively located on two sides of the annular sleeve 118 to restrict the translation of the small gear 106 relative to the supporting member 110. The supporting member 110 may be configured as a separate structure for ease of the installation of the small gear 106.

Returning to FIG. 6, each gear pair of the transmission mechanism 100 drives a corresponding connecting rod 101 through a rack element 119 meshed and connected with the large gear 107. The rack element 119 may be fixedly mounted on the connecting rod 101. As a result, when the large gear 107 rotates, the large gear 107 can axially move the connecting rod 101 via the rack element 119, thereby moving the movable element of one or more phase shifters 103. Each large gear 107 can drive the corresponding connecting rod 101 more stably and efficiently through the rack element 119.

Figure 8:
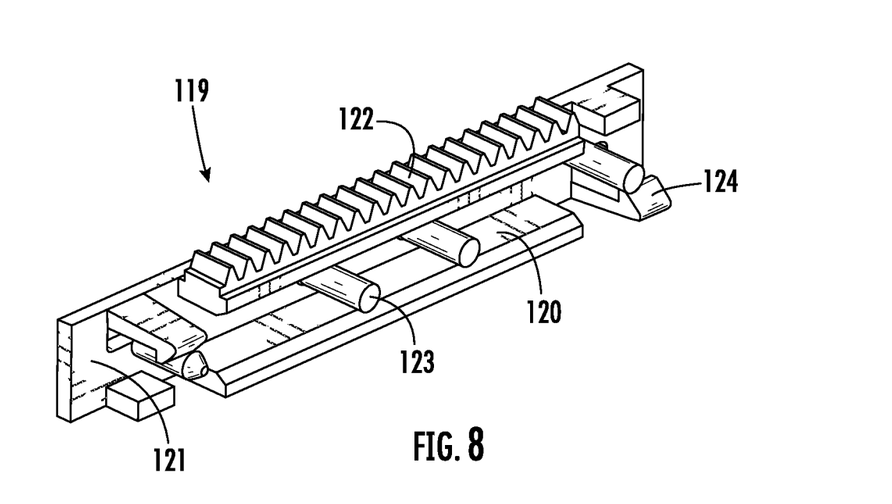
FIG. 8 shows the specific structure of the rack element shown in FIG. 6.

FIG. 8 shows the specific structure of the rack element 119 according to an embodiment of the present invention. The rack element 119 may include a bottom plate 120, a vertical plate 121 extending vertically upward from one side of the bottom plate 120, and a rack 122 located at the top end of the vertical plate 121. The rack 122 includes a plurality of teeth to be meshed with the large gear 107. The vertical plate 121 is provided with a connecting element for connecting with the connecting rod 101. The connecting element may include a series of posts 123 and a pair of snap clips 124. The post 123 is accommodated in a corresponding cylindrical hole in the corresponding connecting rod 101, and the snap clip 124 holds the connecting rod 101 in place when the post is inserted into the cylindrical hole of the connecting rod 101, thereby causing the rack element 119 to be fixed to the connecting rod 101. However, it should be understood that any one of a variety of connecting elements may be used, for example, a post, a bolt, a hook and a connecting fastener, a groove, etc.

Figure 9:
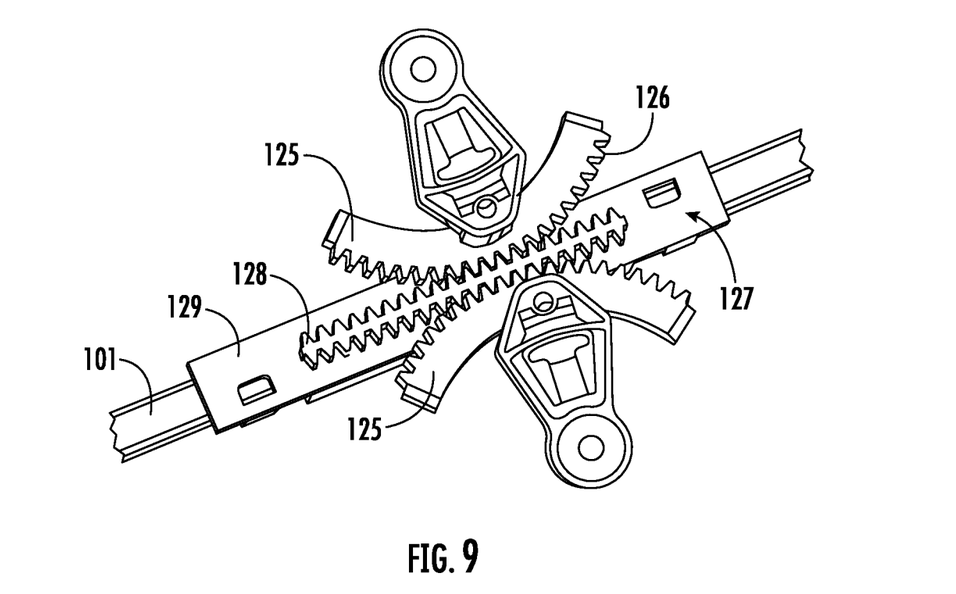
FIG. 9 and FIG. 10 show an arc-shaped connecting member of the transmission mechanism shown in FIG. 3 and a rack element meshed therewith.
Figure 10:
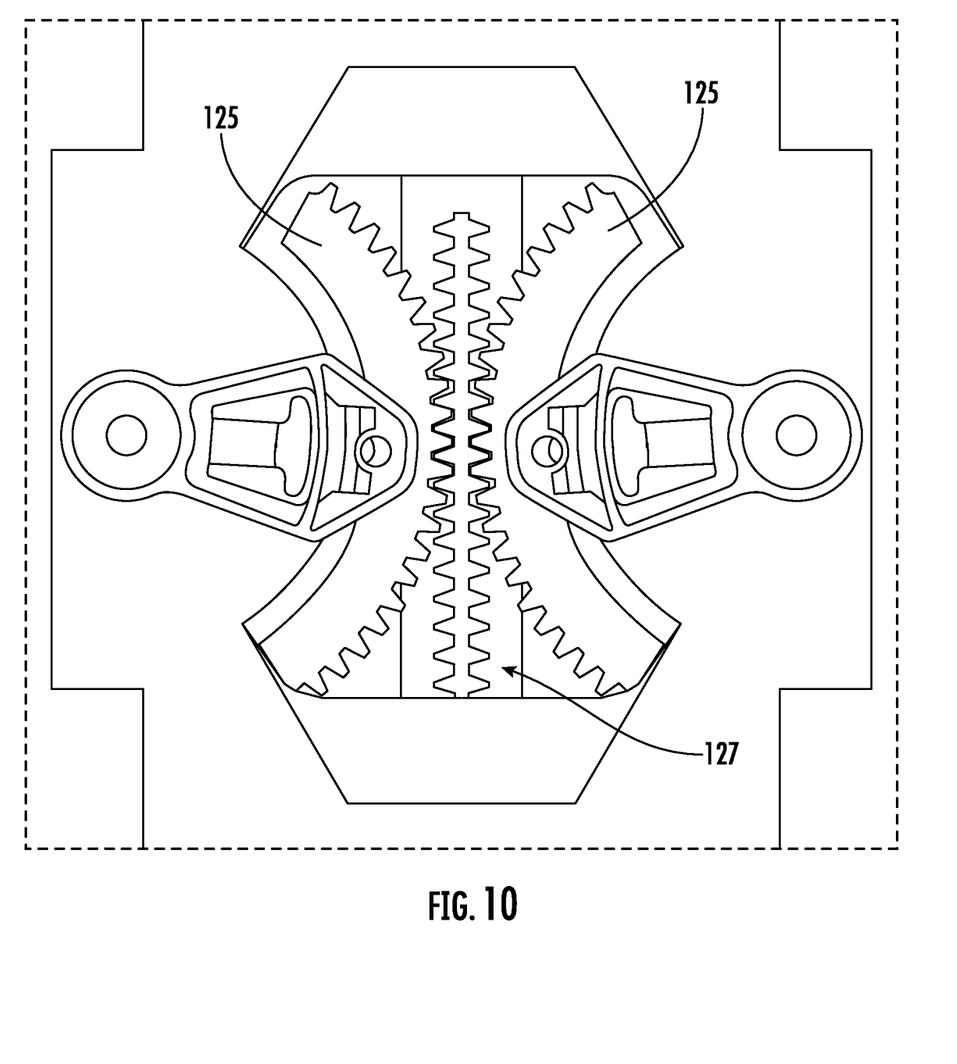

In order to solve the problem that the pulling force 11 generated by the connecting rod 6 of the transmission mechanism 1 in the prior art will generate the tangential component 12 and the radial component 13 when the movable element 9 deviates from the central position of the arc-shaped groove 10, the transmission mechanism 100 of the present invention further includes an arc-shaped connecting member 125 adapted to drive the movable element of the phase shifter to move together along an arc. As shown in FIG. 9 and FIG. 10, the arc-shaped connecting member 125 is configured in the form of an arc-shaped rack, and teeth 126 are provided on the front end surface of the arc-shaped connecting member 125. The movable element (for example, a brush piece of a rotating brush type phase shifter) of the phase shifter may be fixedly connected with the arc-shaped connecting member 125 at the central position of the arc-shaped connecting member 125 so as to move driven by the arc-shaped connecting member 125. The teeth of the arc-shaped connecting member 125 are meshed with teeth 128 of a rack element 127 fixed on the connecting rod 101, so that the arc-shaped connecting member 125 rotates when the rack element 127 moves axially, thereby driving the movable element of the phase shifter to rotate.

Unlike the rack element 119, the rack element 127 includes a bottom plate 129. One surface of the bottom plate 129 is provided with a rack 129 including a plurality of teeth 128, and the opposite surface of the bottom plate 129 is provided with a connecting element such as a post and a snap clip to fix the rack element 127 on the connecting rod 101. In the embodiments shown in FIG. 9 and FIG. 10, each rack element 127 fixed on the connecting rod 101 can drive the movable elements of a pair of phase shifters. Therefore, the rack element 127 may include two sets of teeth 128 arranged in a mirror image, and each set of teeth 128 is meshed with the teeth 126 of an arc-shaped connecting member 125. Accordingly, the two movable elements in each pair of phase shifters are arranged so that their end portions with which the arc-shaped connecting members 125 are connected face each other.

With the help of the arc-shaped connecting member 125, the pulling force of the connecting rod 101 is always maintained in the axial direction of the connecting rod 101 without component in any other directions. As a result, the pulling force of the connecting rod 101 can all be used to move the movable element of the phase shifter without any efficiency loss. In addition, when the arc-shaped connecting member 125 is used, the arc-shaped groove 10 in the prior art is no longer needed. Therefore, there will not be the problem that the removable element of the phase shifter get stuck in the arc-shaped groove 10 and is difficult to move out.

In the embodiments according to the present invention, the worm gear 105, the small gear 106, the large gear 107, the rack elements 119 and 127, and the arc-shaped connecting member 125 may all be made of plastic, and the drive shafts 108 and 109 may be made of glass fiber. In order to further enhance the torsional strength of the drive shafts 108 and 109, the drive shafts 108 and 109 may also be made of metal or other materials with high torsional strength.

Although the transmission mechanism 100 according to the present invention includes a plurality of connecting rods 101 and a plurality of gear pairs in the embodiments shown in FIG. 3 and FIG. 4, the transmission mechanism 100 according to the present invention may also include only one connecting rod 101 and one gear pair. In this case, the transmission mechanism 100 can still amplify the output torque of the motor 102 and reduce the output rotation speed of the motor 102 through the worm gear unit and the gear pair, thereby still retaining all the aforementioned advantages of the transmission mechanism 100.

Exemplary embodiments according to the present invention have been described above with reference to the attached drawings. However, those skilled in the art should understand that various changes and modifications can be made to the exemplary embodiments of the present invention without departing from the gist and scope of the present invention. All changes and modifications are included in the protection scope of the present invention defined by the claims. The present invention is defined by the attached claims, and equivalents of these claims are also included.

The invention claimed is:

1. A transmission mechanism for a base station antenna, including:
   a worm gear unit, which includes a worm driven by a motor and a worm gear meshed and connected with the worm;
   at least one gear pair, each gear pair including a small gear and a large gear that mesh with each other, the small gear and the worm gear being mounted on a common first drive shaft so that the small gear and the worm gear rotate synchronously; and
   at least one connecting rod, each connecting rod including a first rack element fixedly mounted thereon, wherein the large gear of each gear pair is meshed and connected with the first rack element on a corresponding connecting rod so as to axially move the connecting rod via the first rack element when the large gear of each gear pair rotates.

2. The transmission mechanism for a base station antenna according to claim 1, wherein the transmission mechanism further includes an arc-shaped connecting member adapted to be fixedly connected to a movable element of a phase shifter, and the arc-shaped connecting member is configured to be rotationally driven to cause the movable element of the phase shifter to move along an arc.

3. The transmission mechanism for a base station antenna according to claim 2, wherein the arc-shaped connecting member is configured as an arc-shaped rack, and a plurality of teeth are provided on a front end surface of the arc-shaped rack; and wherein, each connecting rod includes at least one second rack element mounted thereon, and the second rack element is meshed and connected with the plurality of teeth of the arc-shaped rack so as to rotate the arc-shaped rack when the connecting rod moves axially.

4. The transmission mechanism for a base station antenna according to claim 3, wherein each second rack element includes two sets of teeth arranged in a mirror image, and each set of teeth is meshed and connected with an arc-shaped rack so that each second rack element can simultaneously drive two movable elements of a pair of phase shifters.

5. The transmission mechanism for a base station antenna according to claim 3, wherein the second rack element includes a bottom plate, one surface of the bottom plate is provided with a rack and the other opposite surface is provided with a connecting element for connecting with the connecting rod.

6. The transmission mechanism for a base station antenna according to claim 1, wherein the at least one gear pair includes a plurality of gear pairs, and small gears of the plurality of gear pairs are mounted on the first drive shaft being spaced apart from each other.

7. The transmission mechanism for a base station antenna according to claim 6, wherein large gears of the plurality of gear pairs are mounted on a second drive shaft being spaced apart from each other.

8. The transmission mechanism for a base station antenna according to claim 7, wherein the second drive shaft is integrally formed with the large gear.

9. The transmission mechanism for a base station antenna according to claim 7, wherein the second drive shaft is made of glass fiber or metal.

10. The transmission mechanism for a base station antenna according to claim 1, wherein the worm extends in a direction of the connecting rod, and the first drive shaft extends in a direction perpendicular to the connecting rod.

11. The transmission mechanism for a base station antenna according to claim 10, wherein one end of the worm is directly or indirectly connected with an output shaft of the motor, and the other end of the worm is supported by a supporting element.

12. The transmission mechanism for a base station antenna according to claim 1, wherein a gear ratio of the worm gear and the worm is from 15 to 50.

13. The transmission mechanism for a base station antenna according to claim 1, wherein the first drive shaft has a non-circular cross-section, and the small gear has a non-circular hole used for the first drive shaft.

14. The transmission mechanism for a base station antenna according to claim 1, wherein the first drive shaft is integrally formed with the worm gear and/or the small gear.

15. The transmission mechanism for a base station antenna according to claim 1, wherein each gear pair includes a supporting member used for the small gear.

16. The transmission mechanism for a base station antenna according to claim 15, wherein the small gear includes a body including a tooth portion provided with teeth and a shaft portion adapted to be mounted in the supporting member to enable the small gear to rotate, and wherein, the supporting member includes an annular sleeve, and the shaft portion of the small gear is rotatably mounted in the annular sleeve.

17. The transmission mechanism for a base station antenna according to claim 1, wherein the first rack element includes a bottom plate, a vertical plate extending vertically upward from one side of the bottom plate, and a rack located at a top end of the vertical plate, and the vertical plate is provided with a connecting element for connecting with the connecting rod.

18. The transmission mechanism for a base station antenna according to claim 1, wherein the connecting rod is made of glass fiber or metal.

19. The transmission mechanism for a base station antenna according to claim 1, wherein the first drive shaft is made of glass fiber or metal.

20. The transmission mechanism for a base station antenna according to claim 1, wherein the transmission mechanism is configured to simultaneously drive at least 32 phase shifters by a single motor.

\* \* \* \* \*